UNITED STATES PATENT OFFICE.

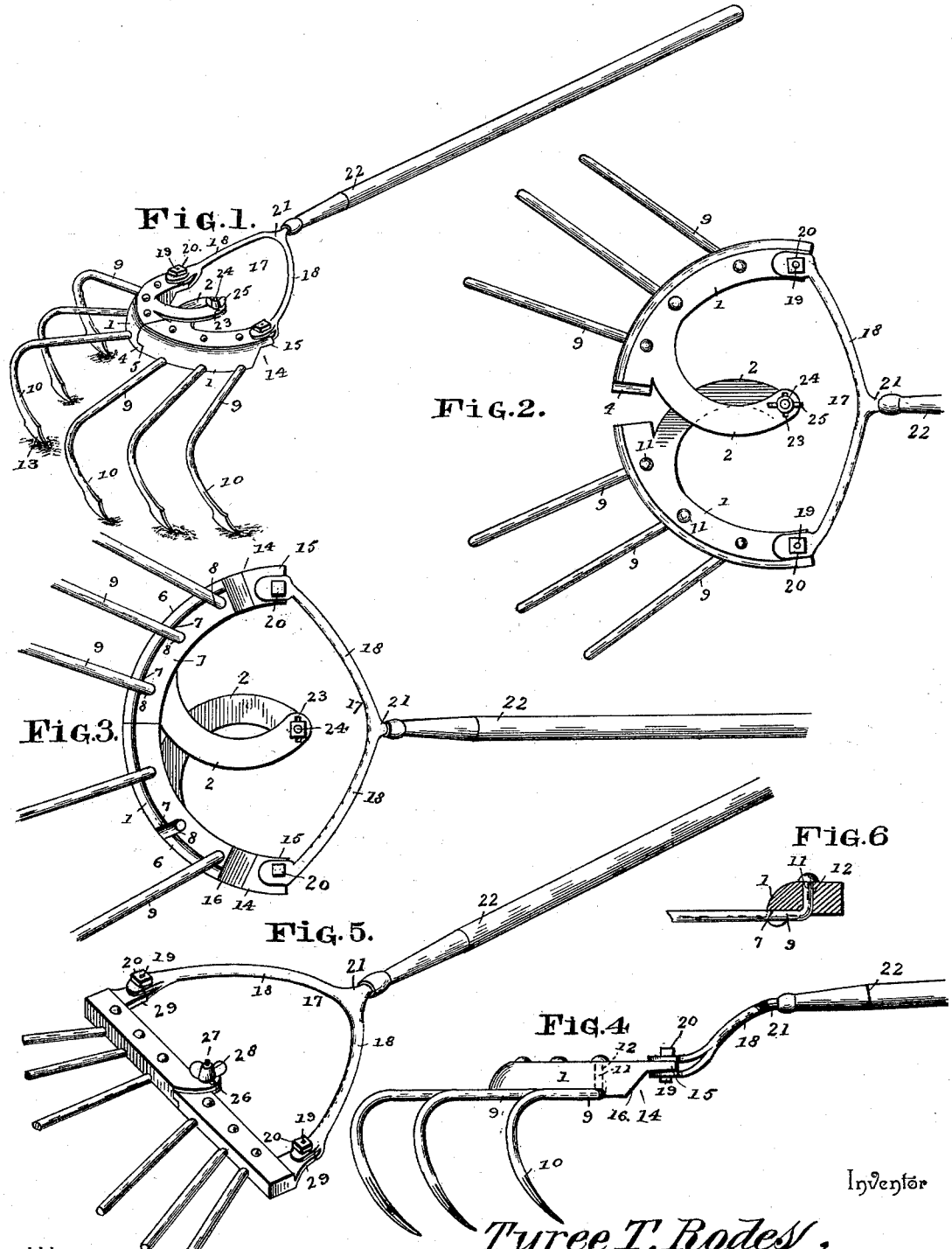

TYREE T. RODES, OF PARIS, MISSOURI.

HAND-CULTIVATOR.

SPECIFICATION forming part of Letters Patent No. 509,558, dated November 28, 1893.

Application filed June 7, 1893. Serial No. 476,842. (No model.)

*To all whom it may concern:*

Be it known that I, TYREE T. RODES, a citizen of the United States, residing at Paris, in the county of Monroe and State of Missouri, have invented a new and useful Hand-Cultivator, of which the following is a specification.

My invention relates to an improved hand or garden cultivator, and the objects in view are to provide a simple and efficient device of light and inexpensive construction whereby the tooth carrying sections or members may be adjusted to separate the teeth into independent groups to operate, respectively, upon the opposite sides of a row of plants, to enable both sides of such row to be cultivated simultaneously; to provide means for connecting and adjusting such sections whereby they will be held from independent vibration whether in their folded or extended positions, and to provide means to prevent lateral play of the cultivator teeth.

Further objects and advantages of my invention will appear in the following description and the novel features thereof will be particularly pointed out in the appended claims.

In the drawings—Figure 1 is a perspective view of a cultivator embodying my invention. Fig. 2 is a plan view with the sections opened or spread. Fig. 3 is a bottom plan view. Fig. 4 is a side view. Fig. 5 is a perspective view of a modified form of the cultivator. Fig. 6 is a detail sectional view.

Similar numerals of reference indicate corresponding parts in all the figures of the drawings.

The head of my improved cultivator is constructed, essentially, in a semi-circular form and comprises the relatively adjustable quadrant-shaped members or sections, 1—1, which are connected by means of overlapping pivoted arms 2—2 which project into the space inclosed by the head with their pivotal points arranged in front of and in alignment with the joint or point of meeting of the quadrant-shaped sections or members. Said meeting ends of the sections or members are preferably rabbeted or matched; one section being provided with a tongue 4 to lie in a rabbet 5 in the other section, when the parts of the cultivator head are closed, as shown in Fig. 1.

The sections or members are provided at their rear or outer edges with a depending peripheral flange 6 which tapers from the central or meeting ends of the sections toward the outer or front ends thereof. This flange is provided at intervals with radially-disposed notches or pockets 7, and the under surfaces of the sections are channeled, as shown at 8, in alignment with said notches or pockets, the shanks 9 of the cultivator teeth 10 lying in the aligned notches and channels, respectively. The cultivator teeth are provided at their front or inner ends with up-turned studs 11 which fit and are secured in vertical perforations or sockets 12 in the sections. The rear ends of the teeth are curved downward and rearward and are tipped in the diamond form, shown at 13, or in any other preferred or suitable manner. The front or outer ends of the sections or members are cut away, as shown at 14, to form the forwardly extending ears 15, said cut-away portion being arranged directly in front of the terminal cultivator teeth to reduce as much as possible the weight of the apparatus. The shoulders 16, which are formed by cutting away the rear ends of the sections, are beveled rearwardly and downwardly to avoid collecting trash, &c. The handle-yoke 17 is provided with arms 18 which are pivotally connected at their free ends to the ears 15 to permit of free pivotal adjustment of the sections or members; pivot bolts 19 engaged by nuts 20 being employed to form the connection between the yoke and the sections. Said yoke is also provided with a tang 21 to engage a socket in the end of the handle 22 in the ordinary way. The pivoted connecting arms 2 are fixed to the inner or concaved sides of the sections or members, being preferably formed integral therewith, and are curved toward each other and then forwardly, whereby they are caused to overlap and lie in parallel planes in all positions of the sections or members. The free rear ends of these connecting arms are slotted, as shown at 23, such slots being engaged by a pivot bolt 24 provided with a winged nut 25.

From the above description it will be apparent that the sections or members of the tool are capable of the desired relative adjustment to cause the cultivator teeth to operate upon opposite sides of a row of plants in order that the earth upon both sides thereof may be cultivated simultaneously without injury to the intervening vegetation. The pivotal connections of the sections or members to the free ends of the arms of the handle-yoke, form fixed pivots upon which such sections or members are adapted to swing freely, controlled by the connection between the overlapping arms 2. When the adjusting bolt, which is employed for the connection of said arms, is tightened the parts of the cultivator are locked and held firmly in the preferred position.

In Fig. 5 I have illustrated a slightly different form of cultivator in which, however, the principle of construction and operation is the same. In this case the tooth-carrying sections or members are straight instead of being curved or quadrant-shaped, and are provided at their inner ends with the slotted connecting arms 26 having a pivotal point 27 directly in front of the overlapping rabbeted ends of the sections, the pivot consisting of an adjusting bolt 28, as in the other form, and forwardly extending ears 29 to which are pivotally connected the arms of the handle-yoke.

It will be seen that the only difference between the two forms which I have illustrated consists in the shape of the sections or members, the one being curved and the other straight, and in the dependent shape of the connecting arms, which in the first form must be curved in order to preserve their mutual dependence in all positions of the sections, while in the latter such dependence can be attained without the curvature shown in the first form.

It will be understood that in adapting my improved cultivator for different uses, various changes as to form, proportion and minor details of construction may be resorted to without departing from the spirit of the invention or sacrificing any of the advantages thereof.

Having described my invention, what I claim is—

1. In a hand cultivator, the combination with a handle-yoke, of a head comprising relatively adjustable sections or members provided at their rear edges with a depending flange which is provided with spaced notches or pockets in alignment with channels in the under surfaces of the sections, and cultivator teeth fitted in said aligned notches or pockets and channels and provided with integral up-turned studs or extensions engaging perforations in the sections, substantially as specified.

2. In a hand cultivator, the combination with a handle-yoke, of relatively adjustable quadrant-shaped tooth-bearing sections or members pivotally connected at their outer ends to the arms of said handle-yoke, forwardly curved overlapping connecting arms integral, respectively, with said sections or members and provided at their over-lapping free ends with slots, and an adjusting bolt engaging such registering slots, the terminals of the arms being concentric with the curvature of the sections respectively substantially as specified.

In testimony that I claim the foregoing as my own I have hereto affixed my signature in the presence of two witnesses.

TYREE T. RODES.

Witnesses:
C. L. CRIGLER,
G. R. JONES.